UNITED STATES PATENT OFFICE.

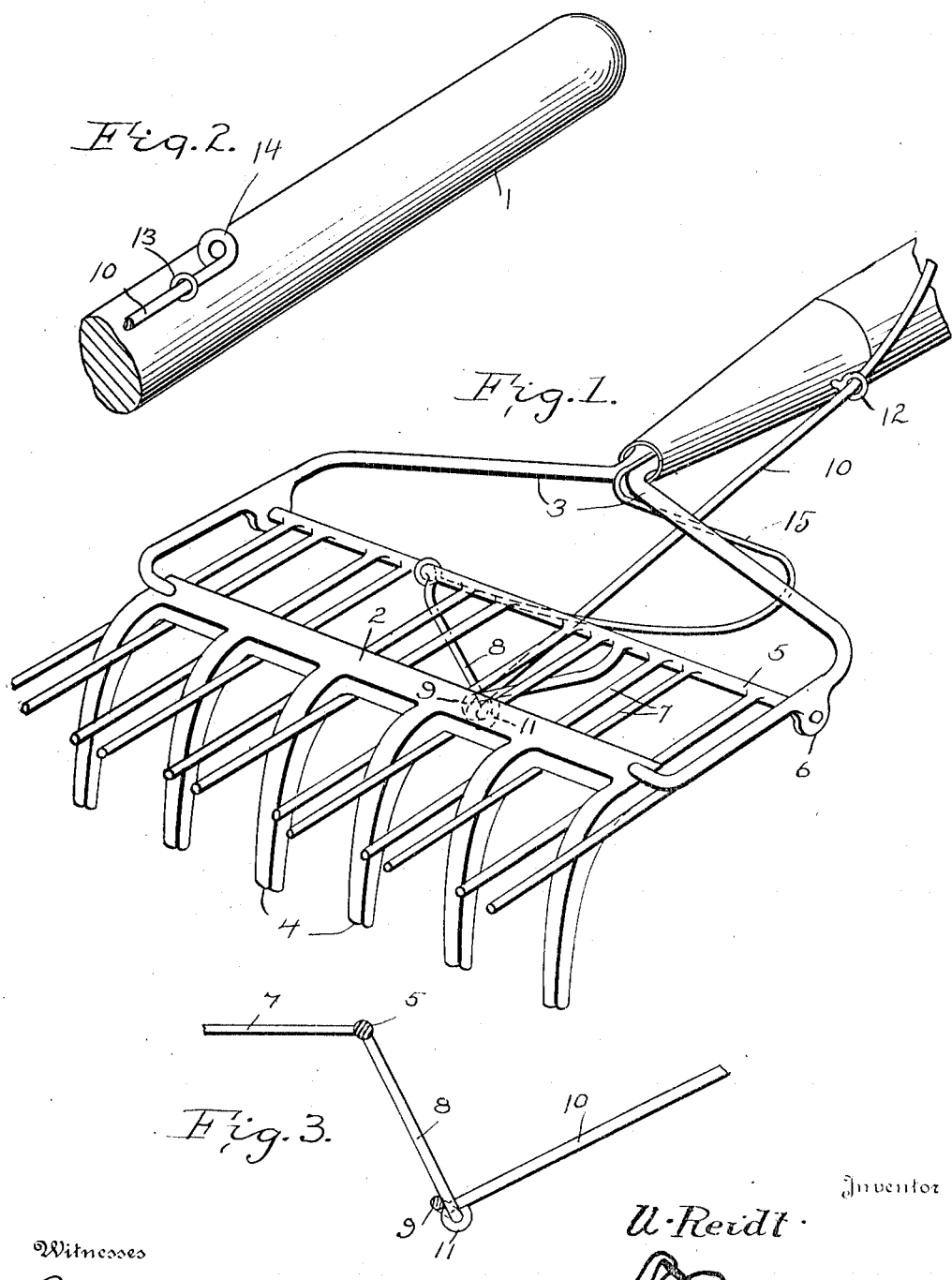

ULRICH REIDT, OF LOS ANGELES, CALIFORNIA.

RAKE.

1,116,121.  Specification of Letters Patent.  Patented Nov. 3, 1914.

Application filed June 23, 1914. Serial No. 846,805.

*To all whom it may concern:*

Be it known that I, ULRICH REIDT, a subject of the Emperor of Germany, residing at Los Angeles, in the county of Los Angeles and State of California, have invented certain new and useful Improvements in Rakes, of which the following is a specification.

My invention relates to new and useful improvements in rakes and more particularly to a cleaning attachment therefor that may be readily and easily attached and detached, is simple as to construction and inexpensive to manufacture and will operate in an extremely reliable and expeditious manner to strip the teeth of leaves, trash and other foreign matter.

An object of importance is to provide novel stripping means that will positively strip the teeth of trash and is so arranged as to not interfere with the rake performing its usual function and also automatically return to normal or inoperative position.

Another object is to provide effective means to operate the stripping means from the rake handle, said means being of simple construction and not taking up much room and also in an accessible position relative to the operator and capable of being easily operated.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a perspective view showing my improved cleaning means attached to a rake and in normal position, Fig. 2 is a detail fragmentary perspective view of the rake handle showing a portion of the operating rod thereon, and Fig. 3 is an enlarged detail sectional view showing the operating member connecting the stripping means with the operating bar.

Referring to the drawings by characters of reference the numeral 1 designates a rake handle, 2 the rake head, and 3 angular supporting arms secured to the handle and at the ends of the rake head. The head 2 carries the usual spaced teeth 4.

My improved cleaning attachment consists of a rotatable bar 5 that is mounted in a horizontal plane between the arms 3 and has its ends rotatably journaled in depending ears or bearings 6 carried by the arms 3. The bar 5 is mounted rearwardly of the rake head 2 and carries a plurality of spaced pairs of stripping fingers 7. The stripping fingers 7 are extended outwardly from the bar 5 and between the fingers of each pair a rake tooth 4 is disposed in such manner that its sides are engaged by the fingers. The fingers extend for a distance equivalent to approximately half their length beyond the teeth so that when moved downwardly to strip the teeth a thorough stripping action is provided. Secured at its ends to the bar 5 and adjacent to the center thereof is a depending V-shaped member 8 that is formed with an eye 9 at its apex portion. This member 8 extends downwardly from the bar and fingers approximately at right angles thereto so that when a pull is communicated thereto from the rear, the bar 5 will be rotated causing the fingers 7 to move downwardly upon either side of the teeth 4 and strip them of whatever trash or foreign matter that may have collected thereon.

As a means for moving the stripping fingers downwardly upon the teeth, I provide an operating rod 10 that is formed with an eye 11 at one end, which eye is mounted within the eye 9 in the member 8. The rod 10 is disposed beneath the bar 5 and arms 3 and is extended rearwardly upon the handle 1. A guide eye 12 is secured adjacent to the secured end of the handle 1 and on one side thereof and slidably receives the rod 10. The rod 10 is extended to a point on the handle that is accessible to the operator so that the device may be operated without causing the operator to stoop and adjacent to its outer end is inserted through a guide eye 13 similar to the one 12, which eye is mounted upon the top of the handle. A relatively large loop 14 is formed at the free end of the rod 10 so that it may be grasped to effect a pull of the rod with the result of operating the stripping mechanism as previously described.

As a means for normally holding the stripping fingers in inoperative position and automatically returning them to such position, I employ a bowed spring 15 that is secured at one end to the end of the handle 1 and at its other end to the bar 5 intermediate its ends. This spring is approximately U-shaped and is disposed normally in a plane approximately equal to that of the normal position of the fingers 7.

In operation when it is desired to clean or strip the teeth the operator grasps the loop 14, and pulls the rod 10 causing a pull to be communicated to the V-shaped member 8 resulting in the rotation of the bar 5. When the bar 5 rotates the fingers 7 are moved downwardly relative to the teeth and serve to strip them of any trash or foreign matter which may have collected thereon.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. The combination with a rake, consisting of a handle, a rake head, arms connecting one end of the handle with the rake head and teeth on said rake head of a rotatable bar mounted between the arms and rearwardly of the head, a plurality of pairs of stripping fingers secured to the bar and extending outwardly therefrom at right angles to the teeth, said fingers engaging opposite sides of the teeth, a V-shaped member secured at its end to the central portion of the bar and extending downwardly therefrom, an operating rod mounted on the handle and secured at one end to the apex portion of the V-shaped member, and a bowed spring secured at its ends to the end of the handle and to the rotatable bar to return the stripping fingers to normal position.

2. The combination with a rake consisting of a handle, a rake head, arms spaced from one another and secured to one end of the handle and ends of the rake head, and teeth carried by the rake head of a stripping bar mounted between the arms and rotatable, fingers carried by the stripping bar and engaging on opposite sides of the teeth, a V-shaped member secured at its ends to the operating bar intermediate the ends thereof and extending downwardly approximately at right angles to the fingers, a bowed spring secured at its ends to the handle and intermediate portion of the bar, and an operating rod secured at one end to the apex portion of the V-shaped member and mounted upon the handle.

In testimony whereof I affix my signature in presence of two witnesses.

ULRICH REIDT.

Witnesses:
 OTTO SANAKER,
 ERNEST LOMBARDO.